Jan. 21, 1964 G. BABEY 3,118,718

ELECTRICAL WIRING DEVICE

Filed Sept. 20, 1960 2 Sheets-Sheet 1

INVENTOR
George Babey
BY Wooster, Davis & Cifelli
ATTORNEYS

ELECTRICAL WIRING DEVICE

Filed Sept. 20, 1960 2 Sheets-Sheet 2

INVENTOR

George Babey

BY Wooster, Davis + Cifelli

ATTORNEYS

United States Patent Office 3,118,718
Patented Jan. 21, 1964

3,118,718
ELECTRICAL WIRING DEVICE

George Babey, Stratford, Conn., assignor to Harvey Hubbell, Incorporated, Bridgeport, Conn., a corporation of Connecticut Filed Sept. 20, 1960, Ser. No. 57,286
1 Claim. (Cl. 339—219)

This invention relates generally to captured washers and screws, and methods of mounting washers and screws so as to be captured. This invention relates more particularly to improved electrical wiring devices which include captured screws.

Washer head screws, both of the machine screw and wood screw types, are known and have many uses. Often the washer is formed integrally with the screw head; however, it is frequently necessary or desirable to form the washer separate from the screw and mount the washer on the screw so as to be captured thereon. In order to capture a separate washer on a screw, it is known that a washer may be slid onto the plain shank of an incomplete screw and positioned adjacent to the screw head before the screw shank is threaded; and thereafter, the screw shank may be threaded up to the washer, resulting in enlargement of the outer diameter of the threaded portion of the screw shank and the capturing of the washer on the screw. This method of capturing a separate washer on a screw, however, involves the difficult manufacturing step of threading a portion of the screw shank while the separate washer is mounted on the plain screw shank.

Captured screws are also known and have many uses. It is known, for example, that a screw may be captured on a wall by substantially the same method used to capture a separate washer on a screw set forth in the preceding paragraph. This method involves inserting an incomplete screw with a plain shank through an appropriate size opening in a wall, and thereafter, threading the screw shank to enlarge its outer diameter up to the wall, thereby capturing the screw on the wall. Here again, it is difficult to form the threads on the screw shank while the screw is mounted in the wall.

It is also known that a screw may be captured on a wall by forming an annular groove immediately adjacent the head of the screw in the threaded shank thereof, forming a slot in the wall opening through a side thereof, and sliding the screw relative to the wall so as to have the edges of the wall that form the slot seat in the groove in the screw. This method of capturing a screw, effective as it is, is unsuitable for many applications wherein having a slotted wall is objectionable.

In many electrical wiring devices it is desirable to incorporate captured screws. A particularly important example is in electrical wiring devices which include terminal blocks that must be removed in order to wire the device. This type of terminal block is frequently referred to as a "clamp" type terminal, and it is widely used wherever high electrical currents are involved; for example, currents in excess of 30 amperes. It is well known that conventional wrap-around wiring is unsuitable for currents of this magnitude. In such electrical wiring devices it is usually necessary to detachably secure the clamp type terminal block to an electrical contact by a screw. In order to wire the device, usually the screw is turned to detach the terminal block, the terminal block removed from the device and a wire is clamped to the terminal block. Thereafter, the terminal block is remounted in the wiring device, and the screw is secured thereto to effect both mechanical and electrical connection of the terminal block and electrical contact. If the screw were not captured in the electrical contact, it would be prone to get separated and lost during wiring of the device.

It is an object of the invention to provide an improved captured washer mounting on a screw and an improved method for effecting the same.

It is another object of the invention to provide improved captured screw mountings and improved methods for accomplishing the same.

It is still another object of the invention to provide improved electrical wiring devices including improved captured screws.

Other objects and further details of that which I believe to be novel and my invention will be clear from the following description and claim taken with the accompanying drawings, wherein:

Figure 1:
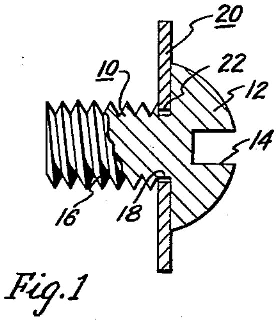
FIG. 1 is a partial sectional, partial side elevational view of a completed screw-washer assembly, i.e., a screw having a captured washer mounted thereon.

In the drawings, FIG. 1 illustrates a screw-washer assembly comprising a machine screw and a flat annular washer that is captured thereon, and FIGS. 2–7 illustrate the parts of this assembly during various stages of manufacture. With reference to FIG. 1, it will be observed that the assembly comprises a machine screw 10 having a head 12 with a kerf 14 formed therein, and a shank 16 which is threaded throughout its axial extent except for a narrow, plain, cylindrical portion 18 immediately adjacent the head 12 which cooperates with the head and thread closest to the head to form a groove. The screw 10 can be best seen by itself in FIG. 2. The FIG. 1 assembly also comprises a flat, annular washer 20 that is mounted on the machine screw 10 so as to be captured thereon by having its portions which form its central opening 22 seated in the groove in the screw 10. The dimensional relationship of the machine screw 10 and washer 20 is such as to permit relative rotation of these parts, but to preclude axial separation of them, and this is what is herein meant by the term "captured." The dimensional relationship is as follows: The outer diameter of the portion 18 is less than that of either the threaded portion of the shank 16 or the head 12. The internal diameter of the central opening 22 in the washer 20 is greater than the outer diameter of the portion 18, but less than the outer diameter of either the threaded portion of the shank 16 or the head 12. The central opening 22 is formed by a narrow, plain, cylindrical portion of the washer 20 that seats in the groove in screw 10. The outer diameter of the washer 20 is larger than that of the head 12, and in fact may be any desired size.

Figure 2:
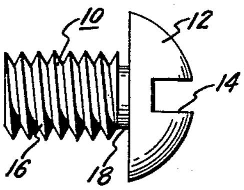
FIG. 2 is a side elevational view of the screw illustrated in FIG. 1.

The machine screw, which is shown by itself in FIG. 2, may be formed by several methods. For example, a completed machine screw having its shank completely threaded may have a narrow portion thereof immediately adjacent its head turned down to form the groove-forming, narrow, plain, cylindrical portion 18. An alternative method is to start with an uncompleted screw having a plain shank with an initial outer diameter equal to that of the portion 18, and then to roll the screw threads from the axially free end of the plain shank toward the head, but short thereof so a narrow, plain, cylindrical portion 18 remains adjacent the head.

It will be apparent to those skilled in the art that starting with a machine screw 10 as illustrated in FIG. 2, and a flat, annular washer 20, as illustrated in FIG. 1, it would not be reasonably possible to mount the washer on the screw, for there would be physical interference between the screw shank and the portions of the washer that form the central opening 22 therein. Therefore, the following method has been devised to readily and efficiently produce the FIG. 1 screw-washer assembly.

Figure 3:
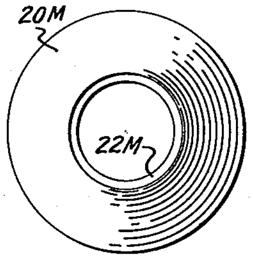
FIG. 3 is a plan view of a washer member which forms the washer of FIG. 1 prior to being assembled on the screw.
Figure 6:
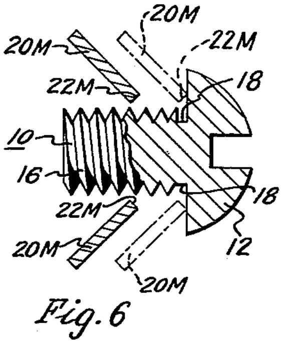
FIG. 6 is a partial sectional, partial side elevational view of the FIG. 2 screw and the FIGS. 3–5 washer member showing these parts in various relative positions which they assume during assembly.
Figure 7:
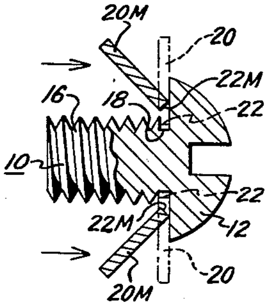
FIG. 7 is a view similar to FIG. 6 but showing the screw and washer member at later stages of assembly.
Figure 4:
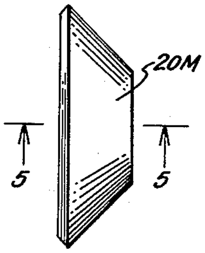
FIG. 4 is a side elevational view thereof.
Figure 5:
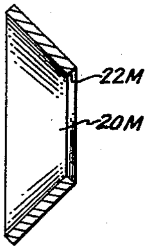
FIG. 5 is a sectional view taken substantially on line 5—5 of FIG. 4.

Instead of starting with a flat, annular washer, such as washer 20, applicant starts with a thin, hollow, cylindrical, frusto-conical washer member 20M, which can best be seen by itself in FIGS. 3, 4 and 5. Washer member 20M has a central opening 22M having an internal diameter which is slightly larger than the outer diameter of the threaded portion of the shank 16, as can best be seen in FIG. 6. In order to assemble the washer member 20M to the machine screw 10, the parts are juxtaposed as illustrated in solid lines in FIG. 6. The parts are then moved relatively toward each other (in any suitable tool or in any other suitable manner) to the relative position illustrated in FIG. 6 by the machine screw 10 and the washer member 20M in dot-dash lines. The latter position of the parts is substantially the same as that illustrated in solid lines in FIG. 7. When the parts are in this position, the opening 22M in the washer member 20M is disposed concentrically about the groove in the screw 10. A force is exerted on the parts which has the effect of moving the radially outer portions of the washer member 20M axially toward the head 12 in the direction of the schematic arrows in FIG. 7. The force is so applied and the parts are restrained in such a manner that the washer member 20M is deformed from its original thin, hollow, cylindrical, frusto-conical configuration, illustrated in FIGS. 3, 4 and 5, to a flat, annular configuration (and thereby transformed into the washer 20) illustrated in solid lines in FIG. 1 and dot-dash lines in FIG. 7. During deformation of the washer member 20M, the central opening 22M contracts and the rim portions of the washer member 20M which form the opening 22M are directed into the groove formed by the shank portion 18. After deformation is completed, the washer member 20M has been converted into the washer 20, the internal diameter of the opening 22 in the washer 20 is less than that of the previously existing opening 22M in the previously existing washer member 20M, and the rim portions of the washer 20 about its opening 22 are seated in the groove in the screw 10. The internal diameter of the opening 22 in the washer 20, as pointed out above in discussing the FIG. 1 assembly, is greater than the outer diameter of the shank portion 18, but less than the outer diameters of the threaded portion of the shank 16 and the head 12. Therefore, the washer 20 is mounted on the machine screw 10 so as to be capable of rotation relative thereto but so as not to be removable therefrom. Hence, the washer 20 is captured on the screw 10.

Figure 8:
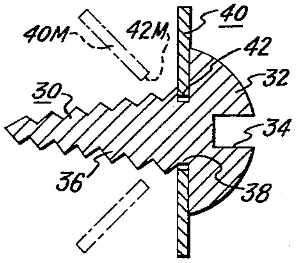
FIG. 8 is a sectional view of a captured washer on a different type of screw.

In FIG. 8 there is illustrated a wood screw-captured washer assembly. Wood screw 30 includes a head 32 with a kerf 34 formed therein, and a shank 36 that is tapered and threaded over all its axial extent other than a narrow, plain cylindrical portion 38 immediately adjacent the head 32. The FIG. 8 assembly includes a flat annular washer 40 that is captured on the screw in substantially the same manner and by substantially the same method as employed to capture the washer 20 on a machine screw 10. The washer 40 has a central opening 42 and it is formed by deforming a washer member 40M having a central opening 42M, which is illustrated in dotted lines in FIG. 8. Although the invention is principally concerned with machine screws, the FIG. 8 modification illustrates that it also contemplates capturing a washer on a wood screw.

Figures 15, 16, 17, 18:
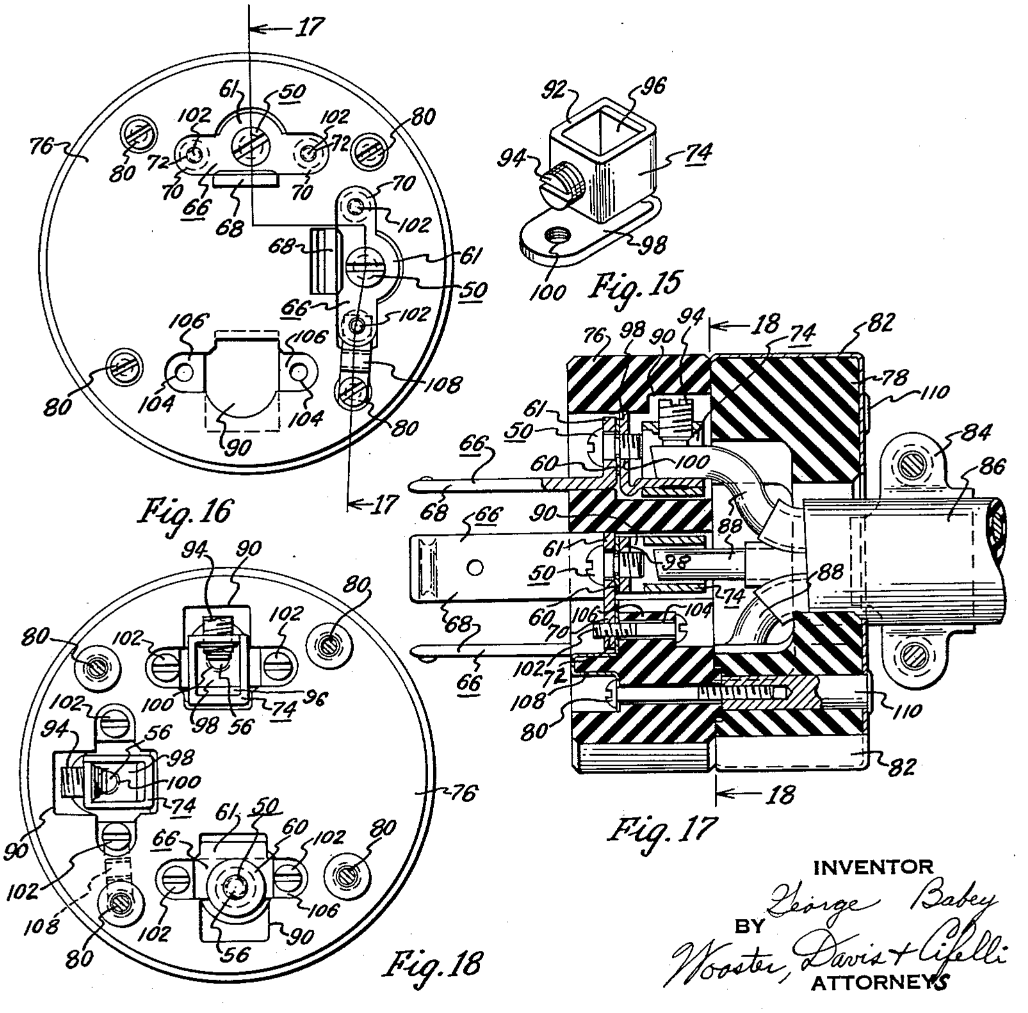
FIG. 15 is a perspective view of a clamp type terminal block which is used in the FIGS. 16–18 wiring device.
FIG. 16 is a bottom plan view of an electrical cap which includes the FIG. 15 terminal block and the FIG. 9 electrical contact-captured screw assembly.
FIG. 17 is a sectional view taken substantially on line 17—17 of FIG. 16.
FIG. 18 is a sectional view taken substantially on line 18—18 of FIG. 17.

The foregoing description of FIGS. 1–8 of the drawings pertains to improved means and methods for capturing washers on screws. The invention also contemplates improved means and methods for capturing screws on wall members. The invention is particularly useful in one practical application wherein it is associated with an electrical contact that forms a part of an electrical wiring device. FIGS. 9–14 illustrate an assembly wherein a captured screw is mounted on a wall of an electrical contact, and FIGS. 16–18 illustrate an electrical wiring device including electrical contacts having such captured screws mounted on them.

With particular reference to FIGS. 9–14, the improved means and method for capturing a screw on a wall member will become apparent. These figures will be described with the wall member forming a part of an electrical contact. However, it should be clearly understood that the invention is not limited thereto, but that the wall member may comprise any wall member on which it is desired to capture a screw.

Figure 9:
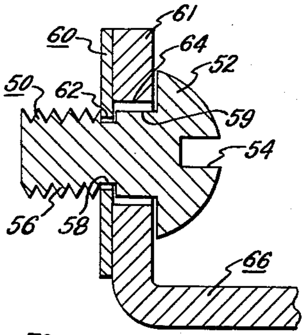
FIG. 9 is a fragmentary longitudinal sectional view of an electrical contact-captured screw assembly, i.e. a captured screw and an electrical contact on which it is mounted.
Figure 10:
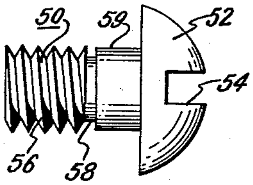
FIG. 10 is a side elevational view of the FIG. 9 screw.
Figure 11:
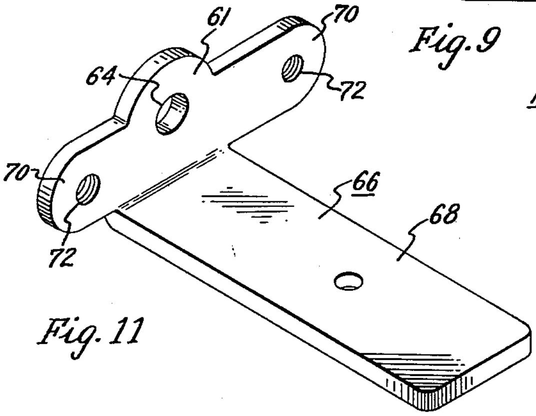
FIG. 11 is a perspective view of the electrical contact of FIG. 9.

In FIG. 10 there is illustrated a machine screw 50 which it is desired to mount on a wall member so as to be captured thereon. The completed captured screw-washer-wall assembly is shown in FIG. 9. The screw 50 comprises a head 52 having a kerf 54 formed therein, and a shank 56 that is threaded from its free end toward the head 52 except for a narrow, plain, cylindrical portion 58, and a relatively wide, plain, cylindrical portion 59 that is disposed between the portion 58 and the head 52. The portion 58 cooperates with adjacent portions of the shank to form an annular groove. The screw 50 illustrated in FIG. 10 may be formed in several ways. For example, commencing with a completed screw having its shank completely threaded, the plain portions 58 and 59 may be formed by a turning operation. Another method of forming the machine screw 50 is to start with an uncompleted machine screw having a plain shank with an outer diameter substantially the same as the portion 59; then to form the threads axially from the free end of the shank up to a point spaced from the head 52, and then to turn the portion 58. In either event, the screw 50 ultimately assumes the general configuration illustrated in FIG. 10.

The dimensional relationship of the screw 50 is generally as follows: The outer diameter of the portion 58 is less than the outer diameters of either the threaded portion of the shank 56, the plain portion 59, or the head 52. The threaded portion of the shank 56 may extend axially any desired amount by lengthening the screw shank; however, the axial extent of the portion 58 is maintained as being considerably less than that of the portion 59.

Figure 13:
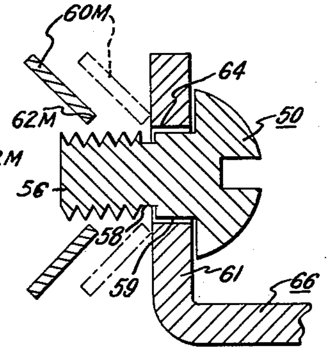
FIG. 13 is a fragmentary longitudinal sectional view of the FIG. 9 electrical contact and screw, and the FIG. 12 washer member showing these parts in various relative positions they assume during assembly.
Figure 14:
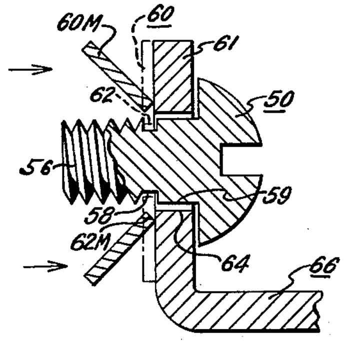
FIG. 14 is a view similar to FIG. 13 but showing the parts during later stages of assembly.

Commencing with the screw 50 illustrated in FIG. 10, the flat, annular washer 60 having a central opening 62 is utilized to capture this screw on a flat wall 61 (see FIG. 9). In order to form and mount washer 10 and to accomplish this captured screw mounting, the wall 61 is provided with an opening 64 having an internal diameter which is greater than the outer diameters of any of the shank portions to permit the insertion and passage of the screw shank through the opening 64, but which is less than the outer diameter of the head 52. To capture the screw 50 on the wall 61 and to form the washer 60, the screw is dipsosed with its shank in the opening 64 as illustrated in FIG. 13 in solid lines. The washer member 60M, which is thin, hollow, frusto-conical and cylindrical, and generally similar to the washer members 20M and 40M described above, is used to form washer 60 and capture the screw 50 on the wall 61. The washer member 60M includes a central opening 62M which is dimensionally related to the machine screw 50 so as to permit its proper disposition relative thereto during assembly by sliding it over the shank of the screw from its solid line to its dot-dash line position in FIG. 13; thereafter, to form the flat, annular, captured washer 60, the washer member 60M is deformed from its solid line to its dot-dash line configuration in FIG. 14, by the exertion of a relative force on the washer member in the direction of the schematic arrows in FIG. 14 while the parts are held. The method of forming and capturing the washer 60 on the screw 50 is substantially the same as that utilized to form and capture the washers 20 and 40 on their associated screws, as set forth above in discussing FIGS. 1–8. The principal difference between the FIGS. 1–8 arrangements and the FIGS. 9–14 arrangement just described is that in the former arrangements, a washer head screw having a separate washer is formed, whereas in the latter arrangement, a screw is mounted on a wall so as to be captured thereon. Apropos the latter point, it will be observed from FIG. 9 that when the captured screw mounting is completed, the rim portions of the washer 60 that form the opening 62 are disposed in the groove formed by the shank portion 58, one side of the washer 60 is contiguous with one side of the wall 61, and the dimensional relationship between the cooperating axial extents and diameters of the portions of the machine screw and wall forming the portion 59 and opening 64, respectively, is such as to effect a secure captured mounting, but to permit rotation of the screw relative to the wall and washer.

The wall mounted, captured screw just described with relation to FIGS. 9–14, as pointed out above, may be incorporated into an electrical contact for an electrical wiring device. Therefore, the wall 61 in these figures has been illustrated as forming a part of an electrical contact 66. This electrical contact is illustrated by itself in FIG. 11, wherein it will be observed that it is a male electrical contact and that it includes an elongated blade portion 68 and a flat mounting portion, which is the previously described wall 61. If desired, however, the electrical contact may be that of the female type. However, for purposes of illustration of one type of electrical blade into which the invention may be incorporated, the male contact 66 is illustrated having the wall 61 with the opening 64 formed therein, and it also includes a pair of laterally extending mounting ears 70 having threaded openings 72 formed therein, which may be utilized to mount contact 66 on the wiring device body.

In FIGS. 16–18 there is illustrated an electrical wiring device into which an electrical contact having a captured screw mounted thereon may be incorporated. It should be clearly understood, however, that the electrical wiring device disclosed is merely exemplary of one of the many useful applications of applicant's invention.

When dealing with electrical wiring devices, such as electrical cord connector caps and bodies which are designed to handle relatively high electrical currents, for example, those in excess of 30 amperes, applicant's invention is extremely useful, because such devices ordinarily require the utilization of captured screws. This need results from the necessity of employing clamp type, electrical terminals in these wiring devices. It is generally recognized that it is not feasible, and certainly not desirable, to utilize conventional, "wrap-around," lead wire terminal connections when connecting the electrical wires to the contacts in wiring devices which handle relatively high electrical current. These wiring devices usually employ clamp type, electrical terminals wherein the electrical lead wires are firmly mechanically clamped. By way of illustration, FIG. 15 shows a clamp-type, electrical terminal block 74 which is widely used. When using these terminal blocks in electrical wiring devices, it is usually necessary to remove them from the body of the device when wiring the device. In order to removably mount them, they are ordinarily connected to the electrical contacts in the device by a screw, and this screw, which is normally rotatably supported in the electrical contact and received in a threaded opening in the terminal block to effect such connection, is turned to separate these parts. The electrical contact is ordinarily rigidly secured to the wiring device body, and therefore, rigidly supports the terminal block when these parts are connected. On sufficient turning of the screw, it is withdrawn out of the threaded opening in the terminal block and the latter may be removed from the wiring device body to effect the desired wiring. After the terminal block has been removed from the wiring device body and wired, it is replaced in the wiring device body and the screw is utilized to connect it to the electrical contact and thereby remount it in the wiring device body. A serious problem exists in connection with this type of wiring device, as will quickly be apparent to those skilled in the art, because the referred-to screw is likely to fall out of the electrical contact and be lost when the terminal block is removed. By employing applicant's invention, the screw may be mounted on the electrical contact in such a manner that it is captured thereon, and does not separate from the electrical contact and get lost when the terminal block is removed.

With the foregoing general understanding of the wiring device application of the invention in mind, the wiring device illustrated in FIGS. 16–18 will now be described more specifically. The illustrated wiring device is an electrical connector cap which is designed for high electrical current applications, and, as illustrated, is designed to accommodate three wires, one of which is a grounding wire. The illustrated cap includes a body of insulation material comprising the sections 76 and 78 which are detachably secured to each other by securing means including the screws 80. The illustrated cap includes a metal shell 82 and a cord clamp 84 (see FIG. 17) for clamping the three-wire cable 86. The latter includes three wires 88 which have their ends bared and individually secured to the terminal blocks 74 that are mounted in the cap body, as can best be seen in FIG. 17. The cable 86 and wires 88 pass through appropriate openings in the body section 78. The terminal blocks 74 are mounted in irregularly shaped recesses 90 formed in the body section 76 (see FIG. 18).

The terminal blocks 74, as can best be seen in FIG. 15, each comprise a generally rectangular, tubular body 92 which adjustably supports a threaded set screw 94 in a threaded opening in one of its walls, and on an opposite wall has secured thereto a securing leg 96 of a mounting foot 98 which, in turn, has a threaded opening 100 formed therein. The terminal blocks 74 are usually removably mounted in the recesses 90 after the bared ends of lead wires 88 have been physically clamped thereon, as best shown in FIG. 17, by having been inserted into the tubular body 92 and clamped therein by the set screw 94. The terminal blocks 74 are rigidly mounted in the body section 76 by the screws 50 which have been captured on the wall 61 of electrical contacts 66, as set forth above in describing FIGS. 9–14. It will be observed in FIG. 17, in this regard, that the screws 50 are captured on the walls 61 of the electrical contacts 66 by the washers 60. The electrical contacts 66 are rigidly secured to the body section 76 by the securing screws 102 that are anchored in mounting openings 72 in mounting ears 70. Securing screws 102 pass through plain openings 104 in projections 106 that extend into the recesses 90 (see FIGS. 16 and 18) from opposite sides and centrally of the recesses.

When the wiring device is completely assembled, the parts are as illustrated in FIG. 17. If it is desired to effect a change in wiring, the body sections 76 and 78 are separated, the screws 50 are turned so as to remove their threaded shank portions from the threaded openings 100 in the mounting feet 98 of terminal blocks 74, until they are removed completely therefrom. During turning of the screws 50, the screws are restrained from axial movement by their captured mountings, and therefore, the terminal blocks move axially away from the screws. The terminal blocks may be lifted out of the recesses 90 after they have been disconnected from the screws 50 and have their set screws 94 adjusted and whatever wiring change is desired effected. When the terminal blocks 74 are removed from the recesses 90 (see lower portion of FIG. 18) the electrical contacts 66 remain rigidly secured to the body section 76, and the screws 50 remain mounted on the walls 61 of the electrical contacts, because of their captured mounting thereon. Therefore, the screws 50 do not separate from and fall out of the openings 64 in the walls 61 of the electrical contact and get lost. After the desired wiring has been effected, the terminal blocks 74 are disposed in the recesses 90 with the openings 100 in their mounting feet 98 adjacent to and aligned with the screws 50, and the latter are turned to have their shanks threadedly received in the openings 100 to thereby directly connect the terminal blocks to the contacts 66 and indirectly mount them rigidly on the body section 76. Thereafter, the body sections 76 and 78 are reconnected and the assembly of the wiring device is completed.

It is particularly important that electrical connection be positively made between the bared end of the usual grounding wire and the grounding electrical contact of the illustrated three-wire cap, for, as is obvious to anyone skilled in the art, failure to make proper electrical connection of the grounding elements would result in an ungrounded, hence, unsafe electrical wiring device. Therefore, applicant's invention is particularly useful in insuring that the mounting screw that is supported by the grounding electrical contact and which connects the terminal block that electrically connects the grounding wire to the grounding electrical contact will not be lost.

In order to provide for the grounding of the metal shell 82, the illustrated wiring device includes means for electrically connecting the grounding wire to said shell. For this purpose, the electrical contact 66 which is illustrated vertically centrally in FIGS. 16–18 has been designed to be the grounding contact, and therefore, is connected to the wire 88 of a cable 86 which is the grounding wire, through its associated terminal block, and to one of the body mounting screws 80, by a short electrical conducting strip 108, which in turn is anchored in a rivet-like nut 110 that is in electrical contact with the shell 82. From the foregoing, the grounding path from the grounding wire of the cable 86 to the shell will be apparent.

Figure 19:
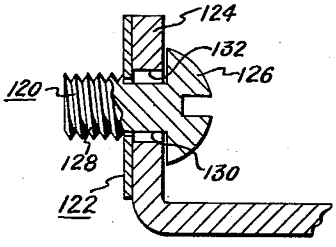
FIG. 19 is a view similar to FIG. 9 showing an electrical contact-captured screw assembly that includes a modified screw.
Figure 12:
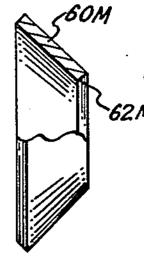
FIG. 12 is a partial side elevational, partial sectional view of a washer member which forms the washer of FIG. 9 prior to being assembled to the screw.

FIGS. 16–18 illustrate an electrical wiring device which includes a plurality of machine screws that are mounted on electrical contacts so as to be captured thereon by the means and method illustrated in FIGS. 9–14. These are the preferred means and method for capturing screws 50 on the walls 61 of electrical contacts 66. However, if desired, another means and method for effectuating a captured screw mounting that may be employed in electrical wiring devices, among other applications, will be apparent from FIG. 19, which is a view that is generally similar to FIG. 9. In FIG. 19 there is illustrated a machine screw 120 having a flat, annular washer 122 associated therewith so as to capture itself and the machine screw on the wall 124. The machine screw 120 includes a head 126 and a shank 128, the major portion of which is threaded except for a relatively wide, plain cylindrical portion 130 immediately adjacent the head 126. As in the case of the other machine screws described, the plain portion 130 may be either turned on a completed screw or formed by rolling the threads of the plain shank of an uncompleted screw short of its head. The outer diameter of the portion 130 is less than that of the threaded portion of the shank 128 or the head 126. The wall 124 has an opening 132 formed therein having an internal diameter that is less than the outer diameter of the head 126, but greater than the outer diameter of the threaded portion of the shank 128. The captured washer 122 is formed and the machine screw 120 is captured on the wall 124 by substantially the same method as is employed to assemble the FIGS. 9–14 arrangement. The principal difference between the FIG. 19 and the FIG. 9 modifications is that the former includes a single, wide, uniform diameter, plain, cylindrical portion (130) adjacent the head of the screw, whereas the latter includes two, plain, cylindrical portions of varying outer diameters (58 and 59), the one of which is of smaller diameter (58) being narrower and receiving the washer (60).

As will be evident from the foregoing description, certain aspects of my invention are not limited to the particular details of construction of the examples illustrated, and I contemplate that various and other modifications and applications will occur to those skilled in the art. It is, therefore, my intention that the appended claim shall cover such modifications and applications as do not depart from the true spirit and scope of my invention.

What I claim as new and desire to secure by Letters Patent of the United States is:

An electrical wiring device comprising: a body of electrical insulation material having a socket formed therein; an electrical contact; means detachably rigidly securing said contact to said body including a wall-like mounting portion on said contact having mounting ears with openings for receiving fastening members adapted to be detachably secured to said body; a terminal block removably mounted in the socket in said body; and means for selectively detachably securing said terminal block to said contact comprising a threaded opening in said terminal block and a headed screw irremovably mounted on said contact so as to be capable of rotating but incapable of axial movement relative thereto, said screw supported by and extending through said mounting portion and being captured thereon by a flat annular washer that is disposed on and adjacent the side of the mounting portion opposite to the side on which the screw head is disposed, said washer having a central opening, the rim portion of which is permanently seated in an annular groove that is formed in the shank of said screw, and said screw projecting into said socket and arranged to be selectively threadedly connected in said threaded opening whereby said terminal block may be selectively detachably secured to said contact.

(References on following page)

References Cited in the file of this patent

UNITED STATES PATENTS

| | | |
|---|---|---|
| 721,559 | Goodridge | Feb. 24, 1903 |
| 767,828 | Norden | Aug. 16, 1904 |
| 1,960,593 | Olson | May 29, 1934 |
| 1,979,382 | Goldman | Nov. 6, 1934 |
| 2,108,316 | Love | Feb. 15, 1938 |
| 2,154,507 | Hunefeld et al. | Apr. 18, 1939 |
| 2,173,206 | Landmeier | Sept. 19, 1939 |
| 2,317,665 | Bredehoft | Apr. 27, 1943 |

| | | |
|---|---|---|
| 2,492,115 | Crowther | Dec. 20, 1949 |
| 2,506,953 | Dzus | May 9, 1950 |
| 2,539,628 | Kingdon | Jan. 30, 1951 |
| 2,900,618 | Geier | Aug. 18, 1959 |

FOREIGN PATENTS

| | | |
|---|---|---|
| 1,179,660 | France | May 27, 1959 |
| 556,758 | Great Britain | Oct. 20, 1943 |
| 757,366 | Great Britain | Sept. 19, 1956 |
| 283,167 | Switzerland | Sept. 16, 1952 |